United States Patent [19]
Noam

[11] Patent Number: 5,592,658
[45] Date of Patent: Jan. 7, 1997

[54] APPARATUS AND METHOD FOR COMPUTER NETWORK CLOCK RECOVERY AND JITTER ATTENUATION

[75] Inventor: Avishay Noam, Ramat Hasharon, Israel

[73] Assignee: Novacom Technologies Ltd., Israel

[21] Appl. No.: 315,179

[22] Filed: Sep. 29, 1994

[51] Int. Cl.⁶ .................................................. G06F 1/10
[52] U.S. Cl. ............................................................. 395/558
[58] Field of Search .............................................. 395/550

[56] References Cited

U.S. PATENT DOCUMENTS

| | | | |
|---|---|---|---|
| 4,803,703 | 2/1989 | Delvca et al. | 375/116 |
| 5,150,068 | 9/1992 | Kawashima | 328/155 |

*Primary Examiner*—Thomas M. Heckler
*Attorney, Agent, or Firm*—Skjerven, Morrill, MacPherson, Franklin & Friel; Forrest E. Gunnison

[57] ABSTRACT

A unit for controlling the data output rate from a device which receives data within a range of input rates. The unit includes an indicator for indicating a level of fullness of the device, first and second clocks which operate at a first and second predetermined frequencies, an edge synchronizer for indicating whether a first pulse of the first clock and a second pulse of the second clock are phase aligned, and a switch. The switch receives output from the indicator and from the edge synchronizer, and switches between the first and second clocks in accordance with the level of fullness and provided that the first and second pulses are phase aligned.

12 Claims, 2 Drawing Sheets

APPARATUS AND METHOD FOR COMPUTER NETWORK CLOCK RECOVERY AND JITTER ATTENUATION

FIELD OF THE INVENTION

The present invention relates to data synchronization generally and more particularly to data synchronization in computer communication networks.

BACKGROUND OF THE INVENTION

Computer communication networks are well known in the art. Typically, a computer network includes a number of stations which are connected therebetween. The stations are typically workstations or servers. An example of a network is the Token-Ring Network which is a local area network.

In a Token-Ring Network, there are typically a number of stations connected in sequence therebetween in a ring like form. In such a network there is one station, usually termed the network active monitor, which includes a network clock which synchronizes operations, such as data transmission, from one station to the other throughout the network.

A drawback of communication networks such as the Token-Ring Network is that they have noise, also termed jitter, such as those caused by time aging and manufacturing tolerances of the cables which connect the stations. Jitter leads to loss of synchronization downstream from the active monitor. Moreover, since the stations are connected in sequence, data sent, for example, from the active monitor to a station distant therefrom, is sent via all the stations located therebetween, and therefore, jitter accumulates and intensifies in the network.

Therefore, it is desirable to attenuate jitter in computer networks in order to reduce jitter accumulation and synchronization problems in the network.

Prior art jitter attenuation systems involve the use of filters or Phase-Locked Loop (PLL) systems which limit the frequencies which the downstream station receives to the network clock frequency. Unfortunately, filters and PLLs are expensive and deteriorate in performance quality over time.

SUMMARY OF THE INVENTION

It is therefore an object of the present invention to provide an improved system and method for jitter attenuation in communication networks.

The present inventor has realized that a unit which controls the data output rate of a device which typically receives data within a range of frequencies can attenuate jitter in communication networks such as the Token-Ring Network.

There is thus provided according to a preferred embodiment of the present invention, a unit for controlling data output rate from a device which receives data within a range of input rates. The unit preferably includes an indicator for indicating a level of fullness of the device, first and second clocks which operate at a first and second predetermined frequencies, an edge synchronizer for indicating whether a first pulse of the first clock and a second pulse of the second clock are phase aligned. The unit preferably also includes a switch, which receives output from said indicator and said edge synchronizer, for switching between the first and second clocks in accordance with the level of fullness provided that the first and second pulses are phase aligned.

Additionally, the device which receives the input data may be a First-In First-Out (FIFO) buffer and it may receive the data from a Digital Phase-Locked Loop (DPLL). Moreover, the data output rate is generally an average of said input data rates.

Further, there is provided, in accordance with a preferred embodiment of the present invention, at system for attenuating jitter in a communication network comprising at least two computers connected therebetween, the system being disposed intermediate any selected ones of first and second computers of the network. The system preferably includes a device which receives input data within a range of input rates and a unit for controlling the data output rate from the device. The unit may include an indicator for indicating a level of fullness of the device, first and second clocks which operate at a first and second predetermined frequencies, an edge synchronizer for indicating whether a first pulse of the first clock and a second pulse of the second clock are phase aligned. The unit preferably also comprises a switch, which receives output from said indicator and said edge synchronizer, for switching between the first and second clocks in accordance with the level of fullness provided that the first pulse and second pulse are phase aligned.

Additionally, the device which receives the input data may be a FIFO buffer and it may receive the data from a DPLL. Moreover, the data output rate is generally an average of said input data rates.

According to a preferred embodiment of the present invention the at least two computers are connected in a ring like form and the network may be a Token-Ring Network.

Further, there is also provided in accordance with a preferred embodiment of the present invention a method for controlling data output rate from a device which receives data within a range of input rates, the method including the steps of indicating a level of fullness of the device, providing first and second clocks which operate at a first and second predetermined frequencies, indicating whether a first pulse of the first clock and a second pulse of the second clock are phase aligned, and switching between the first and second clocks in accordance with the level of fullness provided that the first and second pulses are phase aligned, thereby providing a single averaged data output rate.

Additionally, the data may be received by a FIFO buffer, preferably from a DPLL. Moreover, the data output rate is generally an average of said input data rates.

Further, there is provided, according to the present invention a method for attenuating jitter in a communication network comprising at least two computers connected therebetween, the system disposed intermediate any selected ones of first and second computers of the network, the method including the steps of receiving input data within a range of input rates, and controlling the received data.

Still further, the step of controlling including the steps of indicating a level of fullness of the device, providing first and second clocks which operate at a first and second predetermined frequencies, indicating whether a first pulse of the first clock and a second pulse of the second clock am phase aligned, and switching between the first and second clocks in accordance with the level of fullness provided that the first pulse and second pulse am phase aligned, thereby providing a single averaged data output rate.

Additionally, the data may be received by a FIFO buffer, preferably from a DPLL. Moreover, the data output rate is generally an average of said input data rates.

Finally, according to the present invention, the at least two computers are connected in a ting like form and the network is preferably a Token-Ring Network.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
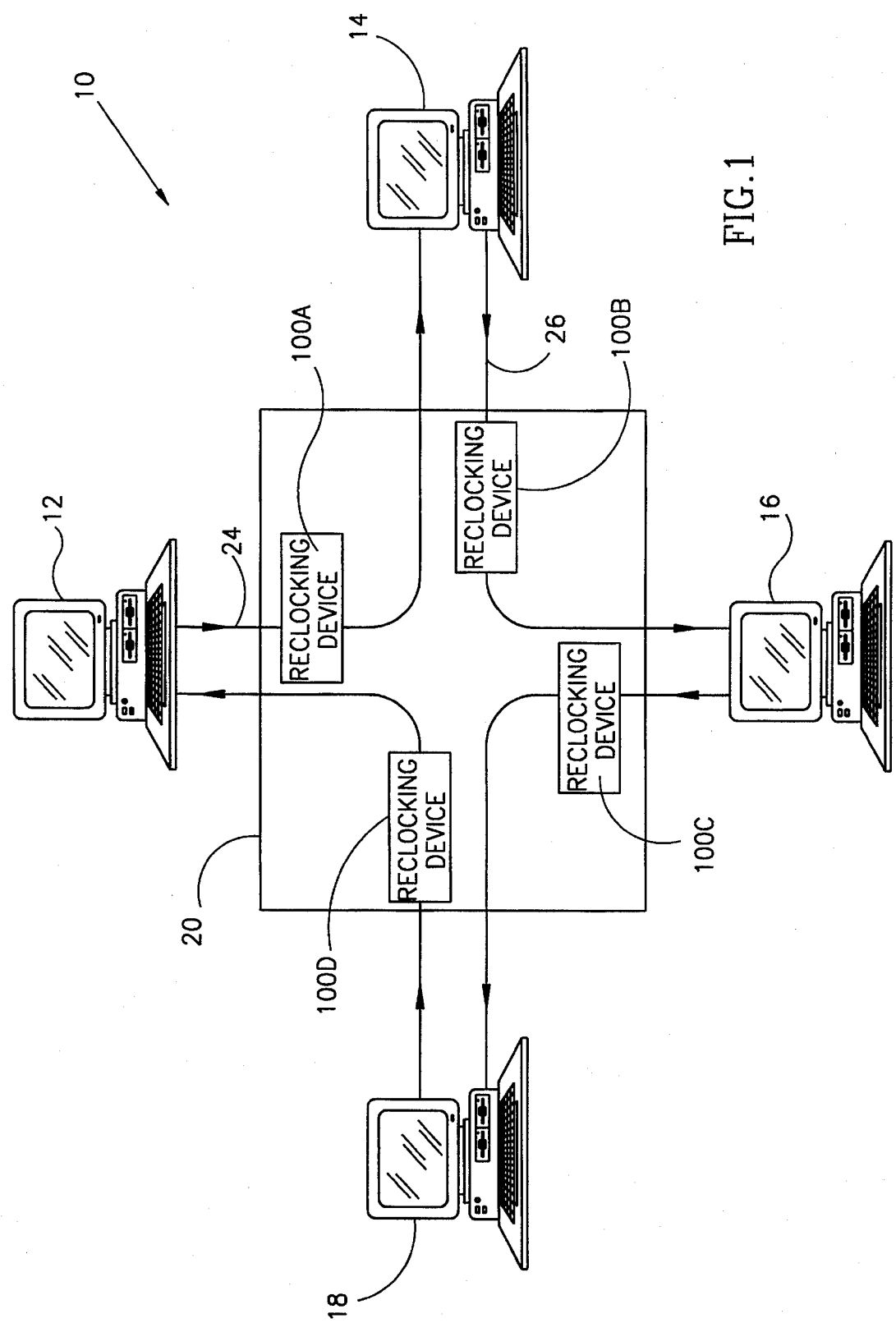
FIG. 1 is a schematic illustration of a communication network constructed and operative in accordance with a preferred embodiment of the present invention.

Reference is now made to FIG. 1 which is a schematic illustration of a communication network constructed and operative in accordance with a preferred embodiment of the present invention. The network of FIG. 1, generally referenced 10, may be any communication network such as the Token-Ring Network. The network 10 preferably comprises a number of stations connected in sequence therebetween, preferably in a ring like form. The network 10 preferably comprises a number of stations, such as the desktop computers indicated by reference numerals 12, 14, 16 and 18. One station, such as computer 12, is the active monitor of the network.

The network 10 preferably also comprises a multi-station access unit 20 to which the cables from each station of the network are connected, such as cable 24 and cable 26. The multi-station access unit 20 preferably comprises a plurality of devices for attenuating jitter accumulated in the network, such as reclocking devices 100A, 100B, 100C and 100D, disposed intermediate computers 12 and 14, 14 and 16, 16 and 18 and 18 and 12, respectively.

Each of the reclocking devices 100A–100D receives jittered data in a range of frequencies and outputs the data in a clean averaged clock frequency, which is preferably the network clock, as described in more detail hereinbelow. Each of the reclocking devices 100A–100D preferably operates to output data which is generally synchronized with the network clock.

For example, the computer 12 outputs data addressed to computer 16 in the network clock frequency. Since the stations of the network 10 are connected in sequence, the data addressed to computer 16 pass through computer 14 and therefore accumulates jitter between computers 12 and 14 and between computers 14 and 16. The data then pass through computer 18 and therefore accumulate jitter between computers 16 and 18 and between computers 18 and 12. The reclocking devices 100A, 100B, 100C and 100D attenuate jitter accumulated downstream of each of the computers 12, 14, 16 and 18, respectively. One possible source of jitter are the cables connecting the computers, for example, cables 24 and 26.

It will be appreciated that the multi-station access unit 20 may be connected to other stations besides the desktop computers 12–18. For example, the multi-access unit 20 may be connected to another multi-access unit 20, thereby expanding the network. Similarly, one reclocking device 100 may be also disposed intermediate two multi-access units 20, thereby attenuating jitter accumulated between two separated sections of the network.

Figure 2:
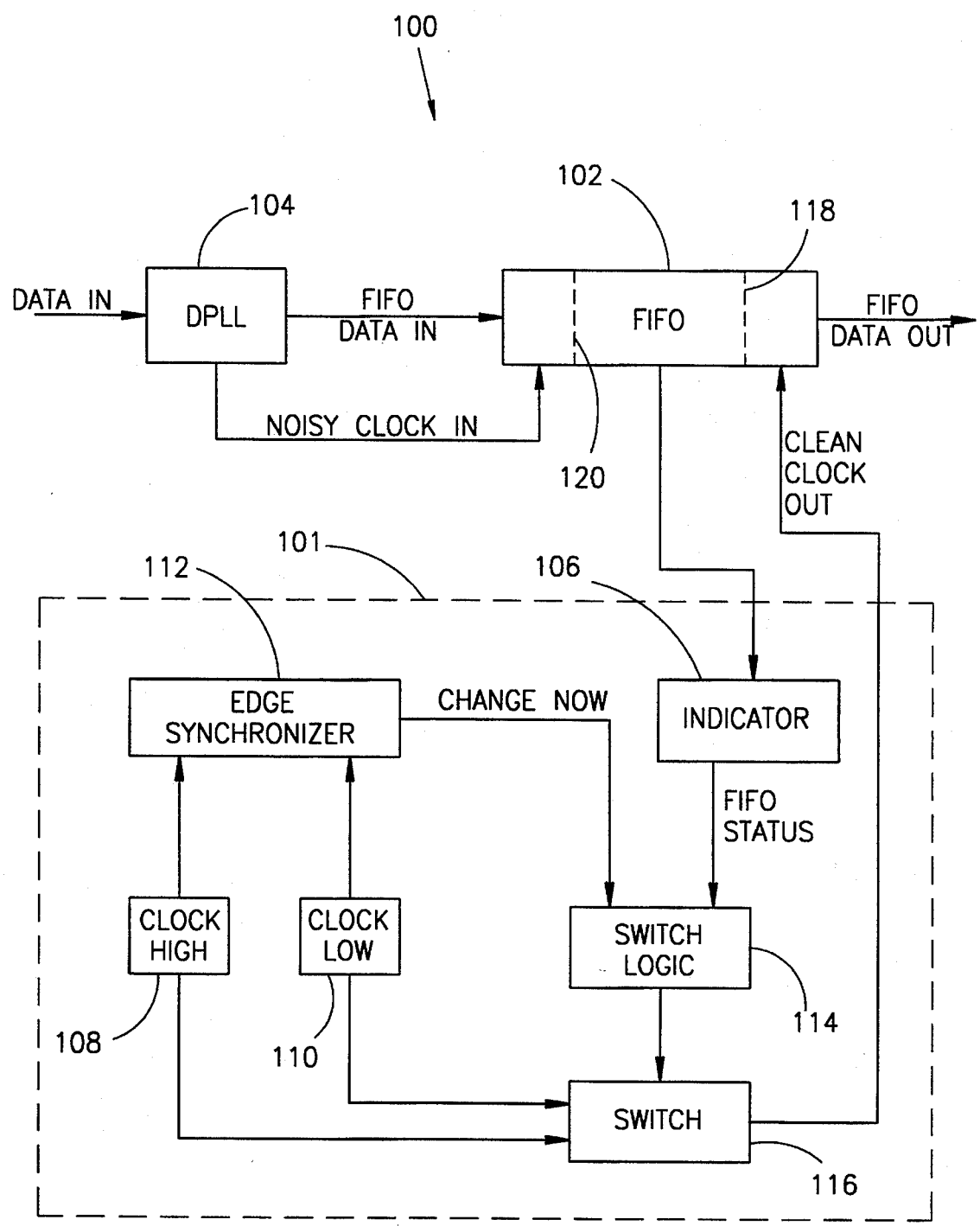
FIG. 2 is a schematic illustration of a data reclocking device comprising a unit for controlling the rate of data output from a device which receives data within a range of input rates, the data reclocking device being constructed and operative in accordance with a preferred embodiment of the present invention.

Reference is now made to FIG. 2 which is a schematic illustration of a reclocking device 100. It will be appreciated that the reclocking device is described with reference to the network 10 for exemplary purposes only and it may be implemented in any system which receives jittered data and outputs data synchronized with any desired clock.

The reclocking device 100 preferably includes a control unit 101, a First-In First-Out (FIFO) buffer 102 and a Digital Phase-Locked Loop (DPLL) 104. The reclocking device 100 preferably receives jittered data and outputs data in an averaged rate therefrom.

According to a preferred embodiment of the present invention the DPLL 104 receives jittered data from an upstream station in the network and provides a noisy clock therefrom. Then, the DPLL provides the data at the noisy clock rate to the FIFO 102. The FIFO 102 receives the jittered data and outputs it at an averaged clear rate which Is determined by the control unit 101.

The control unit 101 preferably comprises a level indicator 106 for indicating the status of the FIFO 102, i.e. how full the FIFO 102 is. The control unit also preferably comprises two clocks, a high clock 108 which operates at a first high frequency and a low clock 110 which operates at a second frequency which is lower than the first frequency, and an edge synchronizer 112 for indicating whether the pulse of the first clock 108 and the pulse of the second clock 110 are phase aligned. Control unit 101 preferably also comprises a switch 116 and switch logic 114 which receives an indication regarding the FIFO status from the indicator 106 and an indication whether the two clocks are phase aligned from the edge synchronizer 112.

The switch 116 switches between the clocks 108 and 110 in accordance with the FIFO status when the pulses of the clocks 108 and 110 are phase aligned as explained in more detail hereinbelow.

According to the present invention, the reclocking device 100 controls the output rate of the data from the FIFO 102 by switching between the clocks 108 and 110. The clocks 108 and 110 are used to define the data output rate from the FIFO 102 by switching therebetween. By switching between the high clock 108, which provides a higher output rate to the FIFO 102, and the low clock 110, which provides lower output rate to the FIFO 102, an averaged output rate is provided.

The switch 116 preferably switches between the high clock 108 and the low clock 110 in accordance with the status of the FIFO 102. When the FIFO 102 is relatively full, as schematically indicated by reference numeral 118 which indicates a high level of fullness, the switch will switch from the low clock 110 to the high clock 108 in order to increase the data output rate from the FIFO 102, thereby reducing the FIFO 102 level of fullness. When the FIFO 102 is relatively empty, as schematically indicated by reference numeral 120 which indicates a low level of fullness, the switch will switch from the high clock 108 to the low clock 110 in order to decrease data output rate from the FIFO 102, thereby increasing the FIFO 102 level of fullness.

It is a particular feature of the present invention that the control unit 101 switches between cloak 108 and clock 110 only when two conditions are fulfilled, namely, the pulses of the two clocks are phase aligned and an indication that the FIFO status requires a switch between the clocks is provided. Preferably, the switch logic 114 receives an indication of the FIFO 102 status from the indicator 106 and a "change now" indication from the edge synchronizer 112 when the two clocks are phase aligned. When the two conditions are fulfilled, the switch logic 114 orders the switch 116 to switch between the two clocks 108 and 110.

Preferably, the edge synchronizer continuously checks whether the two clocks are phase aligned and when such occurrence happens provides the "change now" indication to the switch logic 114.

Preferably, the clocks 108 and 110 operate at two respective frequencies, one which is higher than the network clock frequency and one which is lower therefrom, preferably by the same frequency. For example, if the network clock is 32 Mhz, the high clock 108 may operate at a frequency of 32 Mhz and 3 Khz and the low clock 110 at a frequency of 32 Mhz less 3 Khz. Typically, the control unit 101 switches between the clock 108 and the clock 110 within time intervals on the orders of microseconds to milliseconds, thereby practically providing an averaged output frequency to the output data from the FIFO 102. The averaged output frequency is generally similar to the network frequency.

It will be appreciated that the reclocking device 100 may operate in any selected range of frequencies. For example, the network clock may be 8 Mhz and not 32 Mhz. It is a particular feature of the present invention that the control unit 101 may control the output data frequency of the FIFO 102 in response to data which the FIFO 102 receives from the DPLL 104 in a narrow range of input frequencies such as deviations on the order of 100 ppm.

It will be appreciated that the reclocking device 100 may be incorporated in the stations of a communication network, such as described with reference to FIG. 1 hereinabove, or it may be employed to control any system which should output data in a single frequency from data received within a range of frequencies.

A preferred method for controlling the output data rate of the FIFO 102 preferably includes the following steps:
a. When the FIFO 102 reaches the level 118, the indicator 106 provides a switch indication to the switch logic 114;
b1. If clock 108 is currently selected no action is taken;
b2. If clock 110 is currently selected, the switch logic 114 waits fore change now indication from the edge synchronizer 112 which is provided when the two clocks are phase aligned; and
c. When the "change now" indication is received, the switch logic 114 orders switch 116 to switch to clock 108.

Similarly, the method applies when the indicator 106 indicates that the FIFO 102 has reached level 120, mutatis mutandis.

It will be appreciated that the preferred embodiments described hereinabove are described by way of example only and that numerous modifications thereto, all of which fall within the scope of the present invention, exist. A non-limiting example is to add a one or more clocks to the clocks 108 and 110 of FIG. 1. Another example is to employ the reclocking device 100 in a network in which the computers are not physically connected but are connected only at the time of data transmission.

It will also be appreciated that the present invention is not limited to computer communication networks. Rather, any of the embodiments described hereinabove and any modification thereof may utilize any type of communication network such as telecommunication network.

It will be appreciated by persons skilled in the art that the present invention is not limited to what has been particularly shown and described hereinabove. Rather, the scope of the present invention is defined only by the claims that follow.

I claim:
1. A unit for controlling a data output rate from a First-In, First-Out (FIFO) buffer which outputs data in accordance with either a first output clock or a second output clock, said FIFO buffer receives data within a range of input rates, the unit comprising:
  an indicator for indicating a level of fullness of said FIFO buffer;
  first and second clocks which operate at first and second predetermined frequencies, respectively;
  an edge synchronizer for indicating whether a first pulse of said first clock and a second pulse of said second clock are phase aligned; and
  a switch, which receives an indication from said indicator, said indication being said level of fullness of said FIFO buffer, and from said edge synchronizer, which switches between said first and second clocks if said first and second pulses are phase aligned and maintaining said first clock if said first and second pulses are not phase aligned.
2. A unit according to claim 1 and also comprising a Phase-Locked-Loop (PLL) which provides said input data to said FIFO buffer.
3. A unit according to claim 2 wherein said Phased-Locked-Loop is a Digital-Phase-Locked-Loop (DPLL).
4. A unit according to claim 1 wherein said data output rate is generally an average of said input data rates.
5. A system for attenuating jitter in a communication network comprising at least two computers connected therebetween, the system being disposed intermediate any selected ones of first and second computers of said network, the system comprising:
  a First-In, First-Out (FIFO) buffer which outputs data in accordance with either a first output clock or a second output clock, said FIFO buffer receives input data within a range of input rates; and
  a unit for controlling the data output rate from said FIFO buffer, the unit comprising:
  an indicator for indicating a level of fullness of said FIFO buffer;
  first and second clocks which operate at first and second predetermined frequencies, respectively;
  an edge synchronizer for indicating whether a first pulse of said first clock and a second pulse of said second clock are phase aligned; and
  a switch, which receives an indication from said indicator, said indication being said level of fullness of said FIFO buffer, and from said edge synchronizer, which switches from said first clock to said second clock if said first and second pulses are phase aligned and maintaining said first clock if said first and second pulses are not phase aligned.
6. A unit according to claim 5 and also comprising a Phase-Locked-Loop (PLL) which provides said input data to said FIFO buffer.
7. A unit according to claim 6 wherein said Phased-Locked-Loop (PLL) is a Digital-Phase-Locked-Loop (DPLL).
8. A system according to claim 5 wherein said at least two computers are connected in a ring like form.
9. A system according to claim 8 wherein said communication network is Token-Ring Network.
10. A unit according to claim 5 wherein said delta output rate is generally an average of said input data rates.
11. A method for controlling data output rate from a First-In, First-Out (FIFO) buffer which outputs data in accordance with either a first or a second output clock, said FIFO buffer receives data within a range of input rates, the method comprising the steps of:

indicating a level of fullness of said FIFO buffer;

providing first and second clocks which operate at first and second predetermined frequencies, respectively;

indicating whether a first pulse of said first clock and a second pulse of said second clock are phase aligned; and switching from said first clock to said second clock if said first and second pulses are phase aligned and maintaining said first clock if said first and second pulses are not phase aligned.

12. A method in a system for attenuating jitter in a communication network comprising at least two computers connected therebetween, the system disposed intermediate any selected number of first and second computers of said network, the system comprising a First-In, First-Out (FIFO) buffer which outputs data in accordance with either a first output clock or a second output clock, said FIFO buffer receives input data within a range of input rates and a unit for controlling the data output rate from said FIFO buffer, the method comprising:

receiving input data within a range of input rates in said FIFO buffer; and controlling said received data, the step of controlling comprising the steps of:

indicating a level of fullness of said FIFO buffer;

providing first and second clocks which operate at first and second predetermined frequencies, respectively;

indicating whether a first pulse of said first clock and a second pulse of said second clock are phase aligned; and switching from said first clock to said second clock if said first and second pulses are phase aligned and maintaining said first clock if said first and second pulses are not phase aligned.

* * * * *